May 21, 1968    R. GALIN ET AL    3,383,928
PRIME MOVING SYSTEM FOR CLOTHES WASHER

Filed Feb. 1, 1966    2 Sheets-Sheet 1

INVENTORS
Robert Galin
Justus Miller
Verlos G. Sharpe

By J.C. Evans
Their Attorney

May 21, 1968  R. GALIN ET AL  3,383,928
PRIME MOVING SYSTEM FOR CLOTHES WASHER
Filed Feb. 1, 1966  2 Sheets-Sheet 2

INVENTORS
Robert Galin
Justus Miller
Verlos G. Sharpe

By J.C. Evans
Their Attorney

United States Patent Office 3,383,928
Patented May 21, 1968

3,383,928
PRIME MOVING SYSTEM FOR
CLOTHES WASHER
Robert Galin, Bellbrook, and Justus Miller and Verlos G.
Sharpe, Xenia, Ohio, assignors to General Motors Corporation, Detroit, Mich., a corporation of Delaware
Filed Feb. 1, 1966, Ser. No. 524,239
4 Claims. (Cl. 74—49)

ABSTRACT OF THE DISCLOSURE

In preferred form, a prime moving system for a domestic clothes washer having a reciprocating agitate shaft, the system including a flexible coupling with resilient material and connecting members located to always compressively load the resilient material during forced reciprocation of the agitate shaft by the prime moving system.

This invention is directed to prime moving systems for clothes washers and more particularly to prime moving systems including a rotatable input shaft connected to a crank for translating rotational movement of the input shaft into an arcuate movement for producing reciprocable movement of an output shaft.

In U.S. Patent No. 3,060,712, issued Oct. 30, 1962, a roller drive prime mover system for an agitating and spinning mechanism in a clothes washer is set forth wherein a flexible coupling is included to produce a predetermined flexible movement between a crank driven rocker for reciprocating a shaft portion of the mechanism. In such arrangements, it is observed that the flexible coupling at certain phases of operation of the device is operated so as to place a resilient bushing component thereof under tension. While such an arrangement is suitable for its intended purpose, the relatively large tension forces applied on the coupling often produce a premature failure in the copuling. Moreover, the direction of forces on the coupling producing tension therein will produce substantial unit stresses on a bonded surface between the resilient bushing and metal end plates therein requiring special techniques to assure a good bond therein.

An object of the present invention is to improve roller drive systems for an agitate and spin mechanism in a clothes washer or the like having a rocker therein flexibly coupled to an agitate shaft by the provision of a coupling therebetween including a resilient member and associated means for maintaining at least a portion of said resilient coupling in compression during all phases of the operation of the drive mechanism.

More specifically, it is an object of this invention to provide a roller drive mechanism having a rocker for reciprocating the shaft wherein the rocker is connected to the shaft with a flexible coupling compensate for arcuate movement of the rocker and wherein the flexible coupling includes means for maintaining a resilient bushing in the coupling under compression throughout the arcuate movement of the rocker.

Further objects and advantages of the present invention will be apparent from the following description, reference being had to the accompanying drawings wherein preferred embodiments of the present invention are clearly shown.

Figure 1:
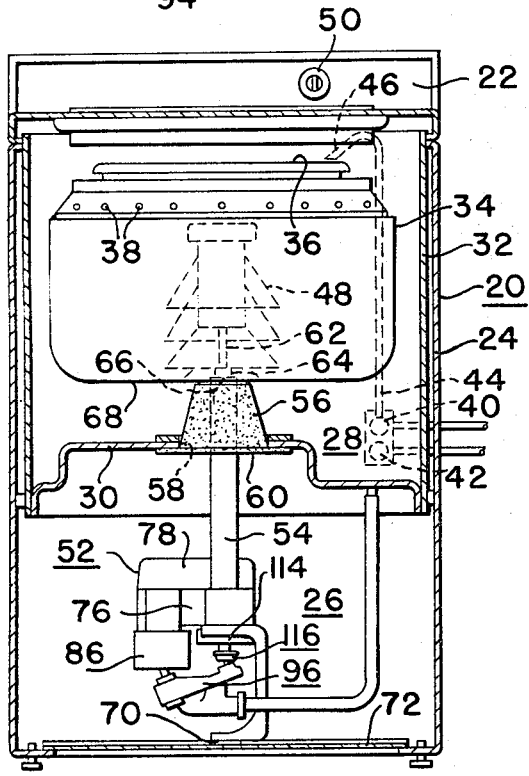
FIGURE 1 is a sectional view, partially in elevation, of a clothes washer including the improved dry running type roller driven agitating and spinning mechanism of the present invention.

In accordance with this invention and with reference to FIGURE 1, a clothes washer 20 is illustrated comprising a control housing 22 and an outer casing or housing 24. The casing 24 generally is divided into a machinery or mechanism compartment 26 and a washing portion or water container chamber 28. A generally centrally located bulkhead 30 separates the mechanism compartment 26 which is bonded further by a cylindrical water container wall 32. Within the water container wall 32 is a spin tub 34 having a top opening 36 and a plurality of centrifuging water flow ports 38 about the circumference thereof. The ports 38 are designed to permit the egress of water from the tub 34 when is rotated at high speed. For filling the tub 34 with water, a conventional water supplied system is illustrated with a hot water solenoid actuated valve 40 and a cold water operated solenoid valve 42 manifolded into a mixed water supply conduit 44 discharging into a chute 46 overlying the opening 36 of the tub 34. Within the tub 34 is located an agitator or pulsator 48 that is adapted to be reciprocated to circulate or agitate the water admitted into the interior of the tub 34. Thus, clothes placed within the tub 34 are washed as the agitating action of the pulsator 48 causes surging current of washing fluid and detergent to pass through the fabric of the clothes. A conventional, sequential operating timer means, shown generally at 50 on the control housing 22, may be included to selectively admit water through the supply conduit 44, to spin the tub 34 and to reciprocate vertically the agitator or pulsator 48.

Figure 2:
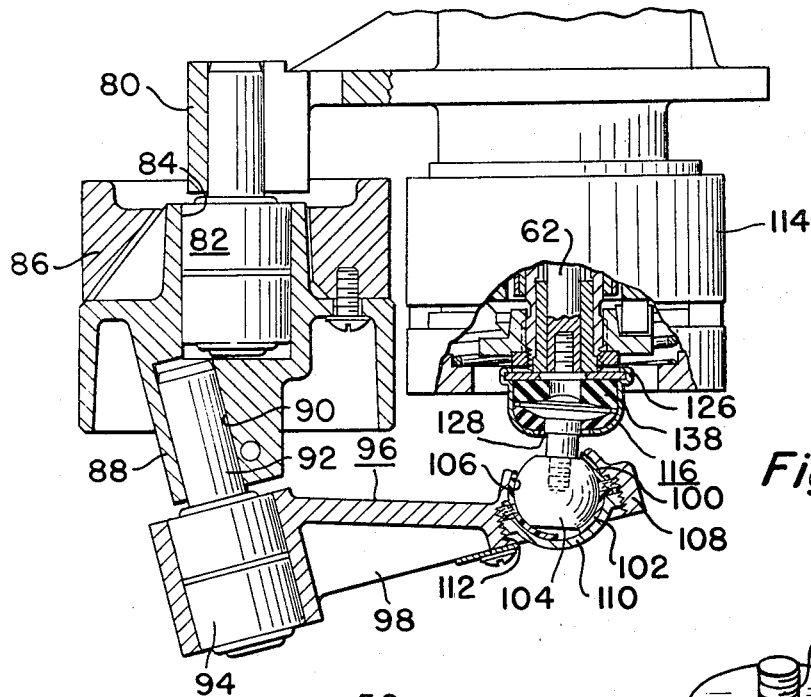
FIGURE 2 is an enlarged, fragmentary, sectional view of a portion of the improved agitate and spin mechanism shown partially in elevation illustrating a pulsator arm of the assembly in a raised, out-of-alignment condition.
Figure 3:
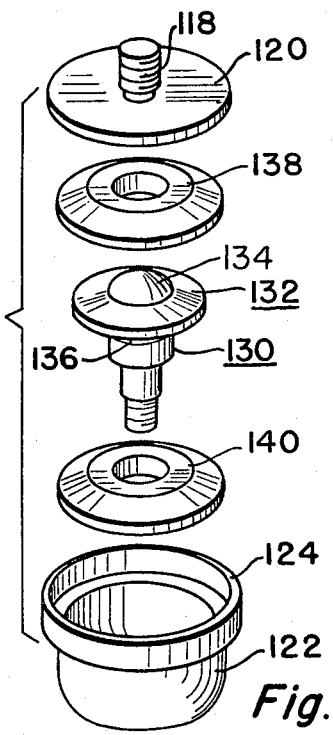
FIGURE 3 is an enlarged, exploded view in perspective showing a flexible coupling in the improvement arrangement.

In the illustrated embodiment of the invention shown in FIGURES 1 through 3, the agitator 48 and spin tub 34 are associated with an improved dry running roller type agitating and spinning mechanism 52 of the type more specifically set forth in U.S. Patent No. 3,087,321 issued Apr. 30, 1963. The mechanism 52 is suspended from a stationary shaft enclosing housing portion 54 which is connected to a resilient cup-shaped support member 56 affixed around an opening 58 in the bulkhead 30 with a sealing gasket 60 being connected thereto to effect a watertight sealed connection of the support member 56 to the bulkhead 30.

Extending upwardly from the stationarily enclosing housing 54 in an agitate or pulsate shaft 62 to which the agitator 48 is connected and a spin shaft 64 which is connected by suitable fastening means, such as a tub support nut 66, to the bottom wall 68 of the spin tub 34. In order to dampen excessive gyrating or swinging movement of the lower end of the agitate and spin mechanism 52, a snubber device, shown generally at 70, is located in frictional engagement with a base 72 of the casing 24. For further details pertaining to the overall operation of the roller type drive mechanism, reference may be had to the aforementioned U.S. Patent No. 3,087,321.

With the reference now to FIGURES 1 and 2, the mechanism portions pertaining to agitation will be described. The mechanism 52 includes a support portion 76 which encloses a reversible drive motor 78 in an upper portion thereof. A boss 80 formed on the support housing 76 serves to carry in press fit relationship an elongated double bearing 82 which is press fit into a central opening 84 of an agitate drum 86. A drive pinion (not shown) serves to rotate the agitate drum 86 through an idler roller (not shown) whenever the operational direction of motor 78 is such as to set up an agitate action. Further, the agitate drum 86 is formed with a crank portion 88 which has an opening 90 therein in which is received a shaft of another double bearing 94. Thus, whenever the agitate drum 86 is rotated, the crank 88 rotates the bearing 92 at a predetermined inclination about the axis of the agitate drum bearing 82.

A pulsator arm or rocker arm assembly 96 has an arm 98 which is press fit onto and carried by the bearing 94. The pulsator arm assembly further is comprised of spherically configured upper and lower ball joint liners 100, 102 of Delrin or other suitable plastic material having a spherical ball bearing 104 of sintered iron or the like held in sandwiched relationship therebetween. The upper spherical ball joint liner 100 is received within a spherical wall 106 on the terminal end 108 of the arm 98. In order to retain the ball joint assembly within the end of the pulsator arm, a pulsator arm cap 110 is threadably received in a tapped opening 112 on the bottom side of the pulsator arm end 108. The cap 110 is suitably fastened to the arm end 108 in a manner more specifically set forth in U.S. Patent No. 3,060,712, issued Oct. 30, 1962.

In accordance with certain principles of the present invention, the ball bearing 104 of the actuator arm assembly 96 is flexibly coupled to a lower end of the agitator shaft 62 which passes through a spin brake assembly 114, the details of which are set forth more specifically in U.S. Patent No. 3,314,257 to J. R. Fosler et al., issued Apr. 18, 1967.

The flexible coupling compensates for a rocking motion created by the rotation of the agitate drum 86 which causes the ball bearing end 108 of the pulsator arm 98 to move through a slight arc with respect to the vertical axis of the agitator shaft 62. This arcuate movement causes the center of the ball bearing 104 periodically to be located out of axial alignment with the axis of the agitate shaft 62. In FIGURE 2, the pulsator arm 98 is shown in its uppermost out-of-alignment position with respect to the axis of the agitator shaft 62.

Previous to the present invention, a yieldable coupling was included between the pulsator arm assembly 96 and the agitator shaft 62 to allow for such misalignment. However, the yieldable connection was arranged so that periodically a rubber bushing therein was substantially, fully loaded in tension. As a result, the coupling at times proved unreliable in service.

In accordance with certain principles of the present invention, the arcing movement in the illustrated drive system is compensated by an improved resilient coupling assembly 116 including an upper stud 118 threadably received within the end of the agitator shaft and having an enlarged disc-like head 120 thereon inserted within an open end of a cup-shaped coupling housing 122. The housing 122 includes an edge 124 staked over the outer periphery of the disc 120 at predetermined circumferentially located points 126 thereon to fixedly secure the housing 122 to the upper stud 118 and thence to the agitate shaft 62. Through a large diameter opening 128 in the bottom of the cup-shaped housing 122 is directed a lower stud 130 threadably received in the spherical bearing 104 and having an enlarged head portion 132 located centrally of the housing 122. The enlarged head 132 includes an upper spherically curved surface 134 and a lower spherically formed surface 136. In the illustrated arrangement a first annular bushing 138 is located of a suitable resilient material such as natural rubber, preferably in one working embodiment, having a Shore hardness of approximately 50. One face of the bushing 138 is in engagement with the disc 120 of the stud 118 and the opposite face thereof is in engagement with the upper spherical surface 134 on the stud 130. A similar annular resilient bushing 140 is located within the housing 122 about the stud 130 and includes an upper surface thereon in engagement with the spherical surface 136 of the stud 130 and a lower surface in engagement with the base of the housing 122, as best seen in FIGURE 2.

By virtue of this arrangement, as the ball pivot end of the arm portion 98 of the pulsator arm assembly 96 arcs relative to the axis of the agitator shaft 62, the enlarged head 132 of the lower stud 130 will press selectively one or the other of the resilient bushings 138, 140 into compression. By virtue of the fact that a resilient material used in compression has greater strength, the illustrated flexible coupling arrangement is more reliable as a means for transferring power from the pulsator arm assembly to the agitator shaft 62. Moreover, in the illustrated assembly, the need for relatively expensive manufacturing procedures to obtain a good bond between a resilient coupling member and supporting end plates associated therewith of the type set forth in Patent 3,060,712 is eliminated.

Figure 4:
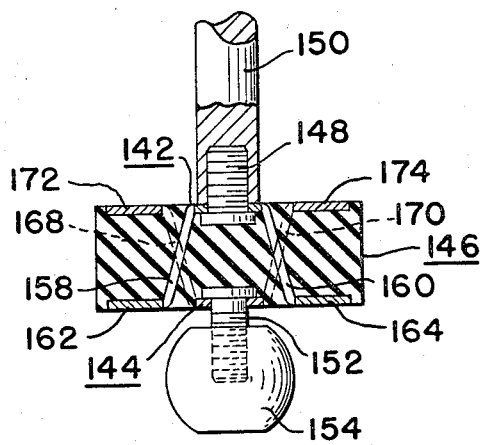
FIGURE 4 is a view in vertical section showing another embodiment of a flexible coupling component in the improved arrangement of the present invention.
Figure 5:
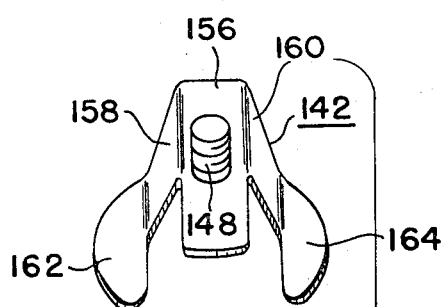
FIGURE 5 is a view in perspective of resilient bushing support members of the embodiment in FIGURE 4.
Figure 6:
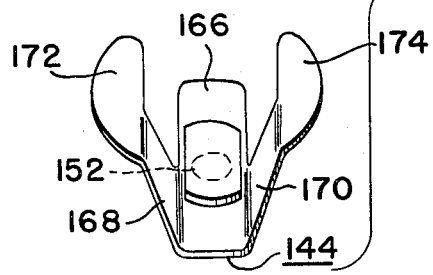
FIGURE 6 is a view in perspective of the assembled coupling unit in the second embodiment of the present invention.
Figure 6:
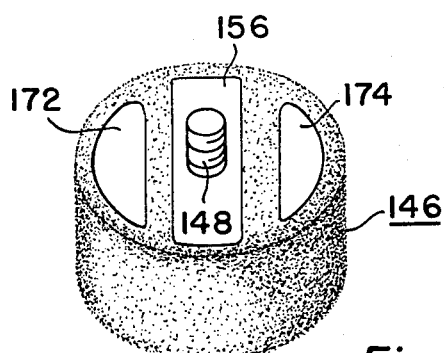

In another embodiment of the invention illustrated in FIGURES 4 through 6, another flexible coupling is shown which, as was the case in the first embodiment, is characterized by an arrangement that maintains a flexible resilient bushing in a coupling assembly under compression at all times to improve the load carrying abilities thereof in the drive system. More particularly, the second embodiment includes coupling plates 142, 144 embedded in and bonded to a block of suitable resilient elastomeric material 146. The end support member 142 includes an upper stud 148 thereon threadably received by the lower end of an agitate shaft 150 like shaft 62 in the embodiment of FIGURE 2. The lower end plate 144 includes a depending stud 152 thereon threadably received in a ball bearing member 154 like ball bearing 104 in the first embodiment. The support plate member 142 includes a stud supporting surface 156 that lies in the upper surface of the block 146 of elastomeric material. A pair of arms 158, 160 are connected at the sides of one end of the portion 156 and depend therefrom in diverging spaced apart relationship with one another. On the end of the arm 158 is located an outwardly directed flange 162 located in the bottom surface of block 146 and a like flange 164 is directed outwardly of the arm 160 and located in the lower surface of the block 146. The lower support member 144 also includes a stud supporting portion 166 located on the lower surface of the block 146 having arms 168, 170 connected on either side thereof and being directed upwardly therefrom in a diverging direction into a spaced apart relationship like the arms 158, 160 of the other coupling support member 142. The arm 168 has an outwardly directed flange 172 thereon located in the top surface of the block 146 and the arm 170 has a like outwardly directed flange 174 thereon located in the upper surface of the block 146 at an opposite side portion thereof.

The arms 168, 170 are located in engagement with arms 158, 160, respectively, whereby the stud supporting portions 156, 166 are aligned with one another on either side of the block 146. The above-described interleaving of the members 142, 144 also aligns flanges 162, 172 on the opposite members with one another at one side of the block 146 and, similarly, the flanges 164, 174 also are aligned with one another at the other side of block 146.

By virtue of this arrangement, during arcuate movement of the ball bearing 154 with respect to the agitator shaft 150, the portion of the elastomeric block 146 between the flanges on the coupling support members 142, 144 will be placed either in compression or in tension. The central portion of the block 146 bounded by the arms 168, 170, 158, 160 of the support members 142, 144 will be oppositely stressed to that portion previously mentioned whereby during all phases of arcuate movement of the ball bearing 154 relative to the axis of the vertically reciprocable agitator shaft 150, at least substantially half of the block of resilient material 146 will be maintained under compression to maintain a relatively low strain in tension on the block 146. Due to the protection against undesirable tensile loading afforded by the placing of the elastomeric block in compression, at no time is there a sufficiently large tension force built up therein to undesirably separate the metal to elastomeric bond in the coupling. Consequently, specifications on the bonding process may be less stringent than in previous flexible couplings in such drive systems as, for example, that set forth in U.S. Patent No. 3,060,712, mentioned above.

In both cases, the dimensional characteristics of the flexible connection in the drive system are substantially identical to that previously included in such drive systems and for this reason, the modified coupling of the present invention is adapted easily to presently existing system as repair parts or as original equipment.

While the embodiments of the present invention as herein disclosed constitute preferred forms, it is to be understood that other forms might be adopted.

What is claimed is as follows:

1. A prime moving system for a clothes washer having a vertically reciprocable agitator shaft comprising an agitate drum rotatable about a fixed axis parallel to the axis of said agitator shaft and a crank portion having an axis at an angle to the axis of said drum, means for rotating said agitate drum, a pulsator arm assembly for translating the rotation of said agitate drum into reciprocation of said agitator shaft, said pulsator arm assembly having an arm portion and first and second bearings at opposite ends of said arm portion, said first bearing having a shaft portion perpendicular to said arm portion and carried by said crank portion for movement therewith to cause said second bearing to move through an arc which intersects the axis of said agitator shaft during rotation of said agitate drum, resilient coupling means having an upper stud connected to said agitator shaft and a lower stud connected to said second bearing, housing means located between said upper and lower studs, said housing means including a cup-shaped member secured to said upper stud, a pair of resilient bushings disposed within said cup-shaped member, said lower stud including an enlarged head portion disposed within said cup-shaped member between said pair of bushings and having spaced apart surfaces thereon engageable with one or the other of said bushings, said head of said lower stud being selectively driven against one or the other of said bushings upon opposite relative movement of said lower stud to load at least one of said bushings under compression at all times as said coupling means directs power from said pulsator arm assembly to said agitator shaft.

2. In the combination of claim 1, said enlarged head of said lower stud having an upper spherical surface thereon engaging one of said pair of bushings and a lower spherical surface thereon engaging the other of said bushings, said enlarged head of said lower stud being movable with respect to said pair of bushings to cause said spherical surfaces thereon to permit limited arcuate movement of said bearing means, said spherical surfaces engaging each of said bushing means to prevent rotation of said pulsator arm assembly with respect to said reciprocable agitator shaft.

3. In the combination of claim 1, said upper stud having a disc portion thereon closing the upper end of said cup-shaped member, said cup-shaped member having portions thereon staked over the outer edge of said disc portion to secure said cup-shaped member thereon, said cup-shaped member having an enlarged opening in the base thereof through which said lower stud is directed in spaced relationship with said cup-shaped member to permit flexible movement of said lower stud with respect to said upper stud.

4. A prime moving system for a clothes washer having a vertically reciprocable agitator shaft comprising an agitate drum rotatable about a fixed axis parallel to the axis of said agitator shaft and a crank portion having an axis at an angle to the axis of said drum, means for rotating said agitate drum, a pulsator arm assembly for translating the rotation of said agitate drum into reciprocation of said agitator shaft, said pulsator arm assembly having an arm portion and first and second bearings at opposite ends of said arm portion, said first bearing having a shaft portion perpendicular to said arm portion and carried by said crank portion for movement therewith to cause said second bearing to move through an arc which intersects the axis of said agitator shaft during rotation of said agitate drum, resilient coupling means having an upper stud connected to said agitator shaft and a lower stud connected to said second bearing, housing means located between said upper and lower studs, resilient bushing means carried by said housing means, said bushing means including a block of resilient material, said housing means including a first plate embedded in said block at one face thereof having spaced apart first legs directed through said block to the opposite face thereof and each of said first legs having outwardly directed flanges thereon embedded in said opposite face of said resilient block, said housing means further including a second plate embedded in said block at the opposite face thereof having spaced apart second legs directed through said block to said one face, each of said second legs having outwardly directed flanges embedded in said one face of said block, said outwardly directed flanges on said spaced apart legs being in spaced parallelism with one another and having a radially outwardly directed portion of said resilient block disposed therebetween, said spaced apart legs of said first and second metal plates having a centrally located portion of said resilient bushing disposed therebetween, said flange portions of said plates and said spaced apart legs of said metal plates coacting to maintain a substantially total portion of said resilient bushing under compression during movement of said second bearing through the arc intersecting the axis of said agitator shaft.

References Cited

UNITED STATES PATENTS

| 1,772,915 | 8/1930 | Roseberg | 287—85 |
| 1,871,963 | 8/1932 | Dill | 287—85 |
| 3,060,712 | 10/1962 | Sisson | 68—23 |

FOREIGN PATENTS 309,034    8/1930    Great Britain.

FRED C. MATTERN, JR., *Primary Examiner.*

W. S. RATLIFF, *Assistant Examiner.*

UNITED STATES PATENT OFFICE
CERTIFICATE OF CORRECTION

Patent No. 3,383,928                                                           May 21, 1968

Robert Galin et al.

It is certified that error appears in the above identified patent and that said Letters Patent are hereby corrected as shown below:

Column 1, line 40, "copuling" should read -- coupling --; line 56, "coupling compensate" should read -- coupling to compensate --. Column 2, line 4, "improvement" should read -- improved --; line 21, "which is bonded" should read -- from the water container chamber 28 which is bounded --; line 26, after "when" insert -- the tub --; line 57, "in" should read -- is --. Column 3, line 9, "shaft" should read -- shaft 92 --. Column 5, line 20, "system" should read -- systems --.

Signed and sealed this 25th day of November 1969.

(SEAL)
Attest:

Edward M. Fletcher, Jr.                                        WILLIAM E. SCHUYLER, JR.
Attesting Officer                                                    Commissioner of Patents